May 21, 1963 M. P. SIEDBAND ETAL 3,090,556

TARGET POSITION PREDICTING SERVOMECHANISM

Filed Aug. 31, 1959

INVENTORS
MELVIN P. SIEDBAND
CHARLES C. RYAN
DAVID R. HOUSTON

BY R. I. Tompkins
ATTORNEY 3,090,556
Patented May 21, 1963

3,090,556

TARGET POSITION PREDICTING SERVO-MECHANISM

Melvin P. Siedband, Baltimore, Charles C. Ryan, Glen Burnie, and David R. Houston, North Linthicum, Md., assignors, by mesne assignments, to the United States of America as represented by the Secretary of the Navy
Filed Aug. 31, 1959, Ser. No. 837,308
1 Claim. (Cl. 235—183)

The present invention relates to target position predicting servo mechanisms and more particularly to target position predicting servo mechanisms wherein measured velocity components of the target are integrated electronically to obtain the target position.

Conventional rate servos which use the more conventional components (including a servo amplifier motor-gearbox, potentiometer, buffer amplifier and differentiator feedback) are bulky and have all the disadvantages associated with mechanical components.

An integrator circuit which utilizes a very high gain amplifier and very low leakage capacitors will have practically zero drift. The output voltage of this integrator will change at a rate and direction determined by the magnitude and polarity of the input signal. If the output of the integrator represents target azimuth position with the proper scale factors, the input could represent azimuth velocity. With the amplifier so arranged that all the bias appears between the cathode of the first stage and ground, then the voltage across the integrating capacitor is identical to the output cathode follower voltage. To establish the initial conditions, the integrating capacitor is charged to the desired voltage and a relay switches it into the integrator circuitry. By cascading two integrator circuits, velocity could be obtained from the first stage and position from the second.

An object of the present invention is to provide an all electronic servomechanism which overcomes the disadvantages of known mechanical servomechanisms.

A further object of the present invention is the provision of a novel all electronic servomechanism which is used to predict the azimuth (or elevation) position of a target.

Other objects and many of the attendant advantages of this invention will be readily appreciated as the same become better understood by reference to the following detailed description when considered in connection with the accompanying drawings wherein.

Figure 1:
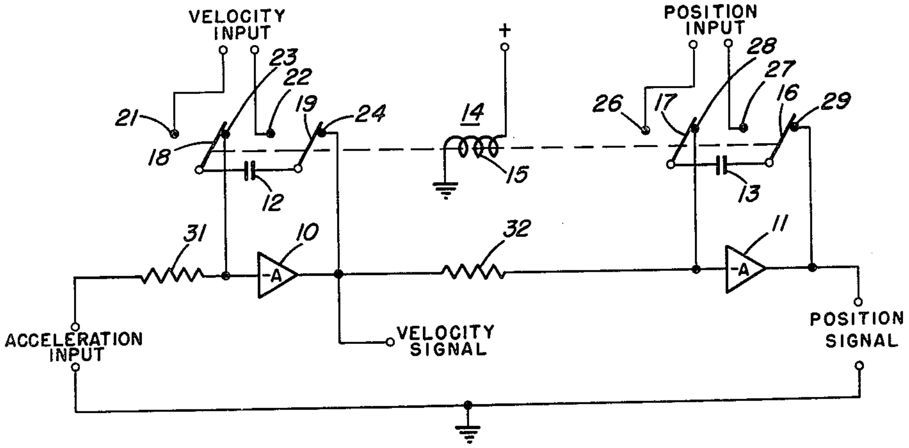
FIG. 1 is a schematic diagram used to illustrate the principle of the invention.

Referring now to the drawings, wherein like reference characters designate like or corresponding parts throughout the several views, there is shown in FIG. 1 two high gain direct current amplifiers 10, 11. A two position switch 14 is provided to connect capacitors 12 and 13 to a velocity input and position input respectively while in a first position and across amplifiers 10 and 11 respectively, while in a second position. In the first position movable contacts 18, 19 engage fixed contacts 21 and 22 respectively and in the second position engage fixed contacts 23 and 24. Also in the first position movable contacts 16 and 17 engage fixed contacts 26, 27 respectively and in the second position engage fixed contacts 28 and 29 respectively. Ratio resisters 31, 32 are provided in the inputs of amplifiers 10 and 11 respectively.

The operation of this circuit is as follows:

Assume that the instant target position predicting servo-mechanism is incorporated in a typical search-while-track radar system. In such systems the target is observed only once every five seconds. The only information which can be obtained during the few milliseconds in which the target is illuminated is the new position which may be obtained as voltages from the antenna potentiometer and rate gyro mounted on the antenna. These voltages are stored as charges on condensers such as 12 and 13, and later these potentials are compared with the output of the integrator. In initiating operation of the circuit capacitors 12 and 13 are first charged to values indicated by the parameter of a normal radar tracking operation. Thus capacitor 12 is charged to a value indicative of antenna velocity, or in other words the voltage as may be obtained from a rate gyro mounted on the antenna. Likewise, capacitor 13 is charged to a value indicative of the position of the antenna as shown by the voltage from an antenna potentiometer. Relay 14 now switches the charges on capacitors 12 and 13 across the integrators for comparison, as the radar system resumes search. At the next "look period," when the target is momentarily illuminated, relay 14 connects the capacitors to the velocity and position inputs where this time they are charged by actual voltages from the rate gyro and antenna potentiometer. Then the system again returns to a search condition with the charge on capacitors 12 and 13 coupled across amplifiers 10 and 11 respectively. Therefore, amplifier 10 is continuously providing an output proportional to the velocity of the target and amplifier 11 is continuously providing an output proportional to the position of the target even though the radar is in a search condition. A new reference is obtained several cycles later by reconnecting capacitor 12 to the velocity signal and capacitor 13 to the position signal.

Figure 2:
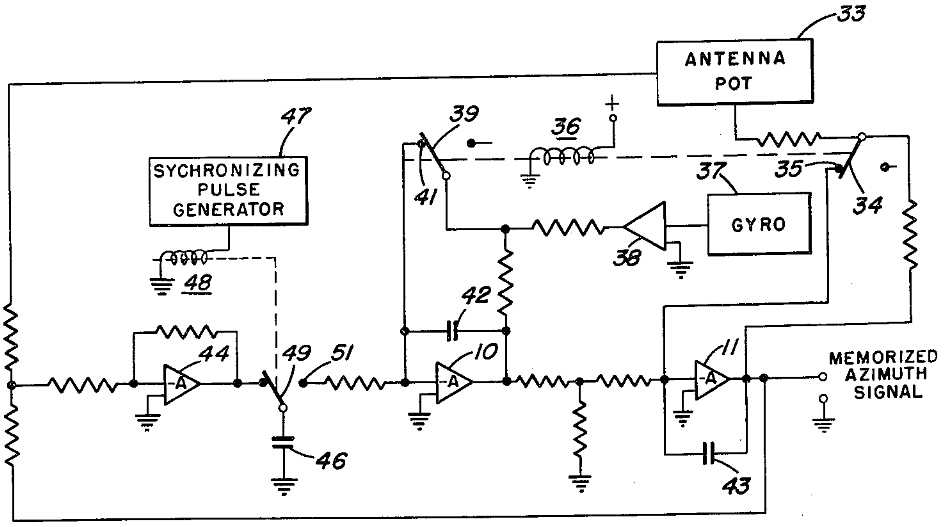
FIG. 2 is a schematic diagram of an illustrative embodiment of the invention.

Referring now to FIG. 2 which shows a memory circuit which may be used in a search-while-track system such as those presently in use in radar installations. This circuit is shown for azimuth tracking, but may be used for elevation tracking as well. The initial conditions are established on amplifiers 10 and 11 by normal radar tracking operation. Antenna potentiometer voltage from antenna potentiometer 33 is connected to amplifier 11 when contacts 34 and 35 of switch 36 are closed. As pointed out in the description relative to FIG. 1, a rate gyro is mounted on the antenna for indicating velocity, and such a gyro is shown as 37 in FIG. 2. Thus an output voltage is connected from gyro 37 through amplifier 38 and closed contacts 39 and 41 to amplifier 10. Since this rate gyro is connected to the antenna, the output voltage will have a magnitude which is proportional to the sweep rate of the antenna. In this respect, the faster the sweep rate, the higher the velocity signal or rate signal will be. Antenna potentiometer 33 and gyro 37 are disconnected from amplifiers 11 and 10 and the radar system resumes search. Thus, since the first amplifier 10 acts upon variables relating to velocity, and the output of this amplifier is coupled to amplifier 11 which acts on variables of position, then the output of amplifier 11 is a voltage proportional to azimuth position moving at a rate proportional to azimuth velocity. At any instant it is thus proportional to a predicted azimuth position.

With capacitors 42 and 43 charged with a voltage from gyro 37 and potentiometer 33 respectively, amplifiers 10 and 11 will continue to integrate these antenna condition signals as long as the capacitors maintain their respective charge. The memorized azimuth signal is fed back to summing amplifier 44, where it is compared with the output of antenna potentiometer 33. Capacitor 46 will be charged proportional to any difference in the two signals. Once during the search pattern, the target will be illuminated and the pulse generator will be energized to produce a pulse to actuate switch 48 to close contacts 49 and 51. Capacitor 46 is then discharged through velocity integrator 10. All resistors shown are for the purpose of obtaining appropriate scale factors. The azimuth error output from amplifier 44 is the difference between antenna potentiometer 33 and the memorized azimuth signal multiplied by the appropriate scale factor. This error signal can be though of as being on the same order as an acceleration signal since it is the input to a velocity integrator and is the acceleration required to correct the system. Thus, the system is capable of azimuth tracking despite the fact that azimuth information can be obtained but once in a given scan cycle.

Obviously many modifications and variations of the present invention are possible in the light of the above teachings. It is therefore to be understood that within the scope of the appended claims the invention may be practiced otherwise than as specifically described.

What is claimed is:

In a system for predicting the position of a target, the combination of a first amplifier, a first capacitor connected across said first amplifier, first circuit means for applying a charge to said first capacitor proportional to the ratio at which a selected target is moving at a given time during a tracking phase, a second amplifier coupled to the output of said first amplifier, a second capacitor connected across said second amplifier, second circuit means for applying a charge to said second capacitor proportional to the position of said selected target at said given time during the tracking phase to establish a reference position of the target, whereby the output of said second amplifier is a voltage proportional to target position moving at a rate proportional to target velocity, an antenna potentiometer comparator circuit means coupled to the output of said second amplifier and to said antenna potentiometer for providing an output which is the difference between the output of said antenna potentiometer and the output of said second amplifier, and third circuit means for coupling the output of said comparator to the input of said first amplifier, said third circuit means including a third capacitor and a single-pole double-throw switch, one terminal of said third capacitor being connected to ground and the other terminal being connected to the movable contact of said switch, said switch having a first position for coupling said third capacitor to said comparator circuit and a second position for connecting said third capacitor to said first amplifier.

References Cited in the file of this patent

UNITED STATES PATENTS

| | | |
|---|---|---|
| 2,621,292 | White | Dec. 9, 1952 |
| 2,750,110 | Och | July 16, 1956 |
| 2,776,424 | Lair et al. | Jan. 1, 1957 |
| 2,776,426 | Altman | Jan. 1, 1957 |
| 2,866,966 | White | Dec. 30, 1958 |
| 2,967,018 | Fogarty | Jan. 3, 1961 |
| 2,983,880 | McFadden | May 9, 1961 |
| 3,008,094 | Trimmer | Nov. 7, 1961 |

OTHER REFERENCES

Varney: Review of Scientific Instruments, vol. 13, No. 1, January 1942, pp. 10 to 16 inclusive.